United States Patent
Hunter et al.

(10) Patent No.: US 7,855,655 B2
(45) Date of Patent: Dec. 21, 2010

(54) CURRENT SWITCH WITH AUTOMATIC CALIBRATION

(75) Inventors: Phillip Hunter, Beaverton, OR (US); James Bernklau, Tigard, OR (US); David A. Bruno, Portland, OR (US)

(73) Assignee: Veris Industries, LLC, Portland, OR (US)

( * ) Notice: Subject to any disclaimer, the term of this patent is extended or adjusted under 35 U.S.C. 154(b) by 338 days.

(21) Appl. No.: 12/228,484

(22) Filed: Aug. 13, 2008

(65) Prior Publication Data

US 2009/0115620 A1    May 7, 2009

Related U.S. Application Data

(60) Provisional application No. 60/993,312, filed on Sep. 10, 2007.

(51) Int. Cl.
G08B 21/00 (2006.01)
(52) U.S. Cl. .................................... 340/664; 702/120
(58) Field of Classification Search ................ 340/664; 379/39; 702/120; 714/736
See application file for complete search history.

(56) References Cited

U.S. PATENT DOCUMENTS

| | | | |
|---|---|---|---|
| 1,100,171 A | 6/1914 | Brown |
| 1,455,263 A | 5/1923 | Oberfell |
| 1,569,723 A | 1/1926 | Dickinson |
| 1,800,474 A | 4/1931 | Scherer |
| 1,830,541 A | 11/1931 | Harris |
| 1,871,710 A | 8/1932 | Lenehan |
| 2,059,594 A | 11/1936 | Massa, Jr. |
| 2,411,405 A | 11/1946 | Yuhas |
| 2,412,782 A | 12/1946 | Palmer |
| 2,428,613 A | 10/1947 | Boyajian |
| 2,428,784 A | 10/1947 | Cole |
| 2,512,070 A | 6/1950 | Nelsen et al. |
| 2,663,190 A | 12/1953 | Ilgenfritz |
| 2,746,295 A | 5/1956 | Lubkin |
| 2,802,182 A | 8/1957 | Godshalk et al. |
| 2,852,739 A | 9/1958 | Hansen |
| 2,943,488 A | 7/1960 | Strobel et al. |
| 3,190,122 A | 6/1965 | Edwards |
| 3,243,674 A | 3/1966 | Ebert |
| 3,287,974 A | 11/1966 | Ciemonchowski |
| 3,374,434 A | 3/1968 | Perry |

(Continued)

FOREIGN PATENT DOCUMENTS

EP    1531334 A2    5/2005

(Continued)

OTHER PUBLICATIONS

Description of KT® 6300, 6400 Split-Core kW/kWH Transducers . . . Enercept KT®, 1 page by Hawkeye® (by Veris Industries, Inc.), at least one year prior to filing date (1997) (unavailable month).

(Continued)

*Primary Examiner*—John A Tweel, Jr.
(74) *Attorney, Agent, or Firm*—Chernoff, Vilhauer, McClung & Stenzel (57) ABSTRACT

A current switch is automatically calibrated when a flow of electric current is initiated in a power cable.

17 Claims, 5 Drawing Sheets

U.S. PATENT DOCUMENTS

| | | | |
|---|---|---|---|
| 3,493,760 A | 2/1970 | Hoadley | |
| 3,512,045 A | 5/1970 | Sanger et al. | |
| 3,584,294 A | 6/1971 | Siwko | |
| 3,593,078 A | 7/1971 | Domshy et al. | |
| 3,696,288 A | 10/1972 | Carman | |
| 3,728,705 A | 4/1973 | Atkins | |
| 3,769,548 A | 10/1973 | Pardue | |
| 3,772,625 A | 11/1973 | Raupach | |
| 3,861,411 A | 1/1975 | Mitchell et al. | |
| 3,955,701 A | 5/1976 | Fisch | |
| 3,976,924 A | 8/1976 | Vanjani | |
| 4,001,647 A | 1/1977 | Klein et al. | |
| 4,001,758 A | 1/1977 | Esper et al. | |
| 4,007,401 A | 2/1977 | Kimmel | |
| 4,030,058 A | 6/1977 | Riffe et al. | |
| 4,048,605 A | 9/1977 | McCollum | |
| 4,096,436 A | 6/1978 | Cook et al. | |
| 4,107,519 A | 8/1978 | Bicek | |
| D249,883 S | 10/1978 | Collins | |
| 4,124,030 A | 11/1978 | Roberts | |
| 4,151,578 A | 4/1979 | Bell | |
| 4,158,217 A | 6/1979 | Bell | |
| 4,158,810 A | 6/1979 | Leskovar | |
| 4,177,496 A | 12/1979 | Bell et al. | |
| 4,198,595 A | 4/1980 | Milkovic | |
| 4,207,604 A | 6/1980 | Bell | |
| 4,215,278 A | 7/1980 | Barbier et al. | |
| 4,227,419 A | 10/1980 | Park | |
| 4,241,237 A | 12/1980 | Paraskevakos et al. | |
| 4,249,264 A | 2/1981 | Crochet et al. | |
| 4,250,449 A | 2/1981 | Shum | |
| 4,253,336 A | 3/1981 | Pietzuch | |
| 4,258,348 A | 3/1981 | Belfer et al. | |
| 4,297,741 A | 10/1981 | Howell | |
| 4,328,903 A | 5/1982 | Baars | |
| 4,354,155 A | 10/1982 | Speidel et al. | |
| 4,359,672 A | 11/1982 | Hart | |
| 4,362,580 A | 12/1982 | Kane et al. | |
| 4,363,061 A | 12/1982 | Vaerewyck et al. | |
| 4,371,814 A | 2/1983 | Hannas | |
| 4,373,392 A | 2/1983 | Nagamoto | |
| 4,384,289 A | 5/1983 | Stillwell et al. | |
| 4,386,280 A | 5/1983 | Ricaud et al. | |
| 4,388,668 A | 6/1983 | Bell et al. | |
| 4,393,714 A | 7/1983 | Schmidt | |
| 4,398,426 A | 8/1983 | Park et al. | |
| 4,408,175 A | 10/1983 | Nelson et al. | |
| 4,413,193 A | 11/1983 | Crockett | |
| 4,413,230 A | 11/1983 | Miller | |
| 4,426,673 A | 1/1984 | Bell et al. | |
| 4,432,238 A | 2/1984 | Tward | |
| 4,491,790 A | 1/1985 | Miller | |
| 4,495,463 A | 1/1985 | Milkovic | |
| 4,506,199 A | 3/1985 | Asche | |
| 4,558,310 A | 12/1985 | McAllise | |
| 4,558,595 A | 12/1985 | Kompelien | |
| 4,574,266 A | 3/1986 | Valentine | |
| 4,605,883 A | 8/1986 | Cockroft | |
| 4,621,532 A | 11/1986 | Takagi et al. | |
| 4,637,020 A * | 1/1987 | Schinabeck | 714/736 |
| 4,660,407 A | 4/1987 | Takami et al. | |
| 4,709,339 A | 11/1987 | Fernandes | |
| 4,739,229 A | 4/1988 | Heiler, Jr. | |
| 4,746,809 A | 5/1988 | Coleman et al. | |
| 4,754,365 A | 6/1988 | Kazahaya | |
| 4,757,416 A | 7/1988 | Wilkerson | |
| 4,758,962 A | 7/1988 | Fernandes | |
| 4,783,748 A | 11/1988 | Swarztrauber et al. | |
| 4,794,327 A | 12/1988 | Fernandes | |
| 4,808,910 A | 2/1989 | Kessi | |
| D301,331 S | 5/1989 | Rhodin | |
| 4,851,803 A | 7/1989 | Hahn | |
| 4,855,671 A | 8/1989 | Fernandes | |
| 4,874,904 A | 10/1989 | DeSanti | |
| 4,885,655 A | 12/1989 | Springer et al. | |
| 4,887,018 A | 12/1989 | Libert | |
| 4,890,318 A | 12/1989 | Crane et al. | |
| 4,926,105 A | 5/1990 | Mischenko et al. | |
| 4,939,451 A | 7/1990 | Baran et al. | |
| 4,944,187 A | 7/1990 | Frick et al. | |
| 4,956,588 A | 9/1990 | Ming | |
| 4,970,476 A | 11/1990 | Kitagawa | |
| 4,972,167 A | 11/1990 | Fujioka | |
| 4,991,050 A | 2/1991 | Heberlein, Jr. et al. | |
| 4,992,709 A | 2/1991 | Griffin | |
| 4,999,575 A | 3/1991 | Germer | |
| 5,003,278 A | 3/1991 | May | |
| 5,014,908 A | 5/1991 | Cox | |
| 5,039,970 A | 8/1991 | Cox | |
| 5,051,601 A | 9/1991 | Atobe et al. | |
| 5,066,904 A | 11/1991 | Bullock | |
| 5,079,510 A | 1/1992 | Komatsu et al. | |
| D323,815 S | 2/1992 | Bouteiller | |
| 5,099,193 A | 3/1992 | Moseley et al. | |
| 5,122,735 A | 6/1992 | Porter et al. | |
| 5,148,348 A | 9/1992 | White | |
| 5,196,784 A | 3/1993 | Estes, Jr. | |
| D335,488 S | 5/1993 | Suzuki et al. | |
| 5,223,790 A | 6/1993 | Baran et al. | |
| 5,267,122 A | 11/1993 | Glover et al. | |
| 5,296,819 A | 3/1994 | Kuroiwa et al. | |
| 5,311,138 A | 5/1994 | Ott et al. | |
| 5,317,274 A | 5/1994 | Nakagawa et al. | |
| 5,323,256 A | 6/1994 | Banks | |
| 5,337,206 A | 8/1994 | Kadah et al. | |
| 5,359,273 A | 10/1994 | Fluckiger | |
| D354,945 S | 1/1995 | Dellavecchia et al. | |
| 5,385,060 A | 1/1995 | Wang | |
| 5,391,983 A | 2/1995 | Lusignan et al. | |
| 5,397,970 A | 3/1995 | Rowlette et al. | |
| 5,410,920 A | 5/1995 | Westwick | |
| 5,426,360 A | 6/1995 | Maraio et al. | |
| 5,430,438 A | 7/1995 | Joos et al. | |
| 5,444,183 A | 8/1995 | Gehrs et al. | |
| 5,450,765 A | 9/1995 | Stover | |
| 5,467,012 A | 11/1995 | Nystrom | |
| 5,471,359 A | 11/1995 | Simpson et al. | |
| 5,473,234 A | 12/1995 | Richardson | |
| 5,502,374 A | 3/1996 | Cota | |
| 5,548,209 A | 8/1996 | Lusignan et al. | |
| 5,557,669 A * | 9/1996 | Perry et al. | 379/339 |
| 5,563,506 A | 10/1996 | Fielden et al. | |
| 5,572,073 A | 11/1996 | Burgess et al. | |
| 5,578,927 A | 11/1996 | Perelle | |
| 5,592,989 A | 1/1997 | Lynn et al. | |
| 5,596,652 A | 1/1997 | Piatek et al. | |
| 5,604,315 A | 2/1997 | Briefer et al. | |
| 5,612,499 A | 3/1997 | Andrew et al. | |
| 5,677,476 A | 10/1997 | McCarthy et al. | |
| 5,705,989 A | 1/1998 | Cota et al. | |
| 5,712,558 A | 1/1998 | Saint-Cyr et al. | |
| 5,753,983 A | 5/1998 | Dickie et al. | |
| 5,767,659 A * | 6/1998 | Farley | 320/106 |
| 5,784,249 A | 7/1998 | Pouliot | |
| 5,808,846 A | 9/1998 | Holce et al. | |
| 5,844,138 A | 12/1998 | Cota | |
| 5,861,683 A | 1/1999 | Engel et al. | |
| 5,880,677 A | 3/1999 | Lestician | |
| 5,880,918 A | 3/1999 | Horbelt et al. | |
| 5,905,439 A | 5/1999 | McIntyre | |
| 5,909,087 A | 6/1999 | Bryde et al. | |
| 5,920,190 A | 7/1999 | Peterson et al. | |
| 5,920,191 A | 7/1999 | Maniero et al. | |
| 5,922,939 A | 7/1999 | Cota | |

| | | |
|---|---|---|
| 5,995,911 A | 11/1999 | Hart |
| 6,005,760 A | 12/1999 | Holce et al. |
| D419,964 S | 2/2000 | Holce et al. |
| 6,020,702 A | 2/2000 | Farr |
| 6,029,524 A | 2/2000 | Klauder et al. |
| 6,044,430 A | 3/2000 | MacDonald |
| 6,046,550 A | 4/2000 | Ference et al. |
| 6,064,192 A | 5/2000 | Redmyer |
| 6,091,023 A | 7/2000 | O'Donnell |
| 6,122,972 A | 9/2000 | Crider |
| 6,124,791 A | 9/2000 | Wolf |
| D431,534 S | 10/2000 | Holce et al. |
| 6,133,709 A | 10/2000 | Puchianu |
| 6,133,723 A | 10/2000 | Feight |
| 6,137,418 A | 10/2000 | Zuercher et al. |
| 6,146,109 A | 11/2000 | Davis et al. |
| 6,219,216 B1 | 4/2001 | Holce et al. |
| 6,236,949 B1 | 5/2001 | Hart |
| 6,269,317 B1 | 7/2001 | Schachner et al. |
| 6,308,140 B1 | 10/2001 | Dowling et al. |
| 6,330,516 B1 | 12/2001 | Kammeter |
| 6,331,821 B1 | 12/2001 | Holce et al. |
| 6,344,951 B1 | 2/2002 | Sato et al. |
| 6,351,206 B1 | 2/2002 | Schweiger et al. |
| 6,373,238 B2 | 4/2002 | Lewis et al. |
| 6,380,696 B1 | 4/2002 | Sembhi et al. |
| 6,384,946 B1 | 5/2002 | Pitsch et al. |
| 6,404,166 B1 | 6/2002 | Puchianu |
| 6,414,241 B1 | 7/2002 | O'Donnell |
| D466,078 S | 11/2002 | Bowman |
| 6,496,378 B2 | 12/2002 | Holce et al. |
| 6,504,357 B1 | 1/2003 | Hemminger et al. |
| 6,504,695 B1 | 1/2003 | Holce et al. |
| 6,549,859 B1 | 4/2003 | Ward |
| 6,591,482 B1 | 7/2003 | Fleege et al. |
| D478,313 S | 8/2003 | Bowman |
| 6,615,147 B1 | 9/2003 | Jonker et al. |
| 6,636,028 B2 | 10/2003 | Lavoie et al. |
| 6,657,424 B1 | 12/2003 | Voisine et al. |
| 6,724,600 B2 | 4/2004 | Holce et al. |
| 6,737,854 B2 | 5/2004 | Bruno et al. |
| 6,756,776 B2 | 6/2004 | Perkinson et al. |
| 6,774,803 B1 | 8/2004 | Tiffin |
| 6,809,509 B2 | 10/2004 | Bruno et al. |
| 6,815,942 B2 | 11/2004 | Randall et al. |
| 6,825,771 B2 | 11/2004 | Bruno et al. |
| 6,856,515 B2 | 2/2005 | Holce et al. |
| 6,861,683 B2 | 3/2005 | Rissing et al. |
| 6,871,827 B2 | 3/2005 | Petak et al. |
| 6,888,712 B2 | 5/2005 | Holce et al. |
| 6,889,271 B1 | 5/2005 | Germer et al. |
| 6,937,003 B2 | 8/2005 | Bowman et al. |
| 6,950,292 B2 | 9/2005 | Holce et al. |
| 6,988,043 B1 | 1/2006 | Randall |
| 7,006,934 B2 | 2/2006 | Jonker et al. |
| 7,053,497 B2 | 5/2006 | Sodemann et al. |
| 7,157,899 B2 | 1/2007 | Bruno |
| 7,161,345 B2 | 1/2007 | Bruno |
| 7,193,428 B1 | 3/2007 | Baron et al. |
| 7,212,930 B2 | 5/2007 | Bruno |
| 7,221,145 B2 | 5/2007 | Bowman et al. |
| 7,230,414 B2 | 6/2007 | Bruno |
| 7,239,810 B2 | 7/2007 | Seely et al. |
| 7,310,049 B2 | 12/2007 | Bowman |
| 7,312,686 B2 | 12/2007 | Bruno |
| 7,330,022 B2 | 2/2008 | Bowman et al. |
| 7,333,345 B2 | 2/2008 | Holce et al. |
| 7,352,287 B2 | 4/2008 | Rupert |
| 7,359,809 B2 | 4/2008 | Bruno |
| 7,447,603 B2 | 11/2008 | Bruno |
| 2004/0227503 A1 | 11/2004 | Bowman et al. |
| 2005/0240362 A1 | 10/2005 | Randall |
| 2006/0085144 A1 | 4/2006 | Slota et al. |
| 2006/0164096 A1 | 7/2006 | Kwon |
| 2009/0115400 A1 | 5/2009 | Hunter |
| 2009/0295370 A1 | 12/2009 | Parker et al. |

FOREIGN PATENT DOCUMENTS

JP 5083776 4/1993

OTHER PUBLICATIONS

Ganssie, "Interrupt Latency," Embedded.com, www.embedded.com/show Article..jhmtl?articleID=9900320, Aug. 26, 2004.

AT91M42800A Summary, "AT91 ARM Thumb Microcontrollers," Atmel, Feb. 2002.

* cited by examiner

CURRENT SWITCH WITH AUTOMATIC CALIBRATION

CROSS-REFERENCE TO RELATED APPLICATIONS

This application claims the benefit of U.S. Provisional App. No. 60/993,312, filed Sep. 10, 2007.

BACKGROUND OF THE INVENTION

The present invention relates to a current switch for monitoring a current level in an electrical circuit and enabling an alarm if the current level is abnormal and, more particularly, to a current switch that is automatically calibrated to the current level of a circuit when it is installed in the circuit.

Many industrial and commercial environments utilize large numbers of devices that are electrically powered. The operation of these devices, for example fans, pumps, compressors and heaters, can be important to the protection of valuable property and successful completion of processes that may involve costly or hazardous equipment, operations or materials. These devices may be stand-alone devices controlled by a local controller, but are often widely dispersed components of an integrated and, commonly, automated system that are monitored and operated by a remotely located controller or building management computer. The operation of a device or load is commonly monitored by a current sensor that is electromagnetically coupled to a cable supplying electrical power to the load. The current sensor outputs a signal that is representative of the level of current flowing in the cable and, if the current changes significantly, an alarm signal is transmitted to the controller which may display a warning or an advisory signal on a control panel for a human operator and/or selectively enable or disable power to the load and/or to other load(s) that may be effected by a malfunction of the monitored load.

Holce et al., U.S. Pat. No. 5,808,846, incorporated herein by reference, disclose a protection device comprising a combination current sensor for monitoring current in a cable supplying power to a load and a relay controlling the operation of the load in response to a signal from a remotely located control panel. The protection device includes a sensing transformer comprising a wire wound core that encircles the power cable. A changing current in the power cable produces a varying electro-magnetic field around the cable which, in turn, induces a magnetic flux in the core of the sensing transformer. The magnetic flux in the core induces a voltage in the wire windings that is representative of the current flowing in the power cable. Thus, the power cable is the primary winding and the wire winding is the secondary winding of the sensing transformer. The wire winding is electrically connected to an input circuit that converts the voltage signal received from the secondary winding of the sensing transformer to an output signal representative of the current flowing in the power cable. The output signal is transmitted to a control panel and analyzed to determine if the controlled device is to be disabled or enabled. The control panel transmits an appropriate signal to a relay or switch circuit, typically comprising a triac or relay, which responds to the signal from the control panel by shorting or isolating electrical terminals in series with the controlled load.

While electric loads, such as motors, are often operated with electric power from sources that have a constant frequency, for example 50 or 60 hertz (Hz.) for the U.S. electrical distribution grid, variable frequency drives are, increasingly, being used to supply power to AC motors and other loads in residential, industrial and commercial systems. The speed of the motor can be varied by varying the frequency of the output of the variable frequency drive enabling improved control over the fan, pump or other mechanical load powered by the motor and an increase in system energy efficiency. However, both the frequency and the voltage of the variable frequency drive's output vary producing a substantial variation in the current to the motor. False alarms are common when a current switch with a single alarm set point current is used in combination with a variable frequency drive.

Cota et al., U.S. Pat. No. 5,705,989, incorporated herein by reference, disclose a current monitor for a load connected to a variable frequency drive. The current monitor comprises a measuring system with a sensor, comprising a current transformer, linked with a power cable supplying power to an electrical load, such as a motor. The measuring circuit includes a plurality of circuit models each comprising a frequency band, a range of frequencies, and a respective reference voltage or current. In the operating mode, the frequency of the signal in the power cable is sensed by a frequency counter and a frequency band selector determines the stored reference power cable voltage or current that corresponds to the frequency band that includes the frequency of the alternating current detected in the power cable. The measuring circuit compares the selected reference voltage or current to the actual voltage or current detected in the power cable by the sensor to determine if an alarm condition exists. By correlating the frequency of the power cable signal with the magnitude of the power cable current or voltage an abnormal current warranting an alarm can be determined accurately. In a preferred embodiment, the measuring circuit automatically learns an amplitude of the reference voltage or current for each of the different frequency bands when a reset control is activated or upon the expiration of an updating interval. Automatically updating the reference voltages or currents for each frequency band enables the measuring system to adapt to a dynamic electrical system.

However, when a system is initially installed or a new current sensor is added to an existing system, the operating range of the current in the power cable must be determined and the sensor calibrated for the expected range of currents. Calibrating large numbers of widely dispersed current sensors or even one sensor that is remotely located from the controller can be time consuming and tedious. What is desired, therefore, is a current sensor that automatically calibrates itself when installed in an electrical circuit.

DETAILED DESCRIPTION OF PREFERRED EMBODIMENTS

Figure 1:
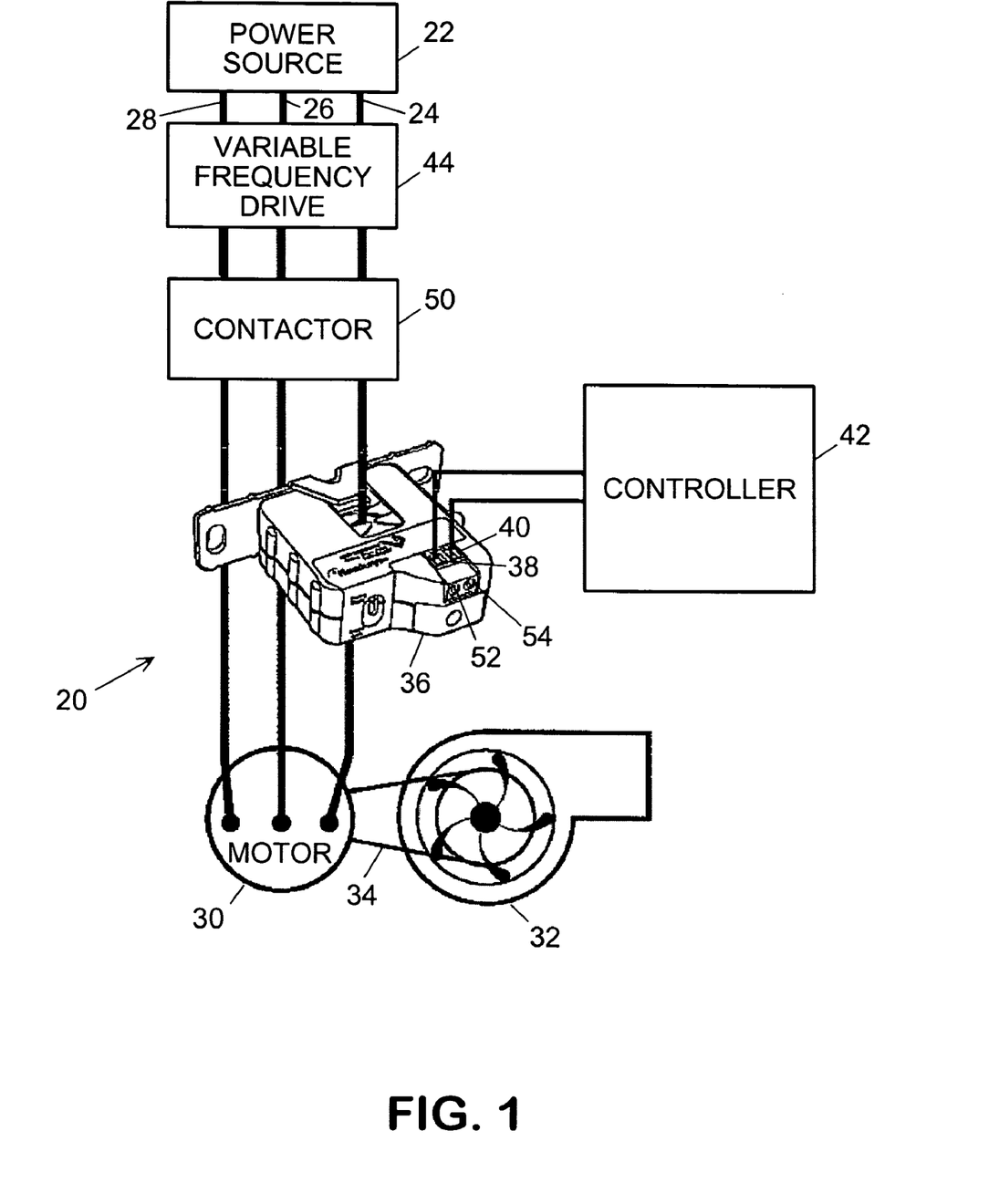
FIG. 1 is a schematic illustration of a power control system for an electric motor driven fan.

Referring in detail to the drawings where similar parts are identified by like reference numerals and referring more particularly to FIG. 1, an exemplary electrical system 20 includes an electrical load that is connectable to a power source 22, typically an electric power distribution grid, by power cables 24, 26, 28. By way of examples, electrical loads may include valves, heaters, relays, lights, and motors which may be used to drive pumps, fans, compressors, etc. In the exemplary system, the electrical load comprises a motor 30 that is drivingly connected to a mechanical load, a fan 32, by a drive belt 34. A current switch 36 monitors the current flow in one of the power cables. When the fan motor is running and current is flowing in the power cable, a current sensor in the current switch is electromagnetically linked to the power cable current and outputs a signal reflecting the magnitude and frequency of the current in the cable. If the magnitude of the current is within normal limits, a controller in the current switch causes the terminals 38, 40 of the current switch, which are communicatively connected to a system controller 42, to assume one of an open or a closed connection state. If the magnitude of the current flowing in the power cable varies significantly from a normal current, the controller changes the connection state of the switch terminals signaling the system controller of a malfunction in the portion of the circuit monitored by the current switch. In the exemplary circuit, the motor is connected to the power source through a variable frequency drive 44 that converts a constant frequency, alternating current from the power source to an output having a variable frequency and a variable voltage to control the speed of the motor enabling the motor to adapt to changing system conditions and improving energy efficiency.

Figure 2:
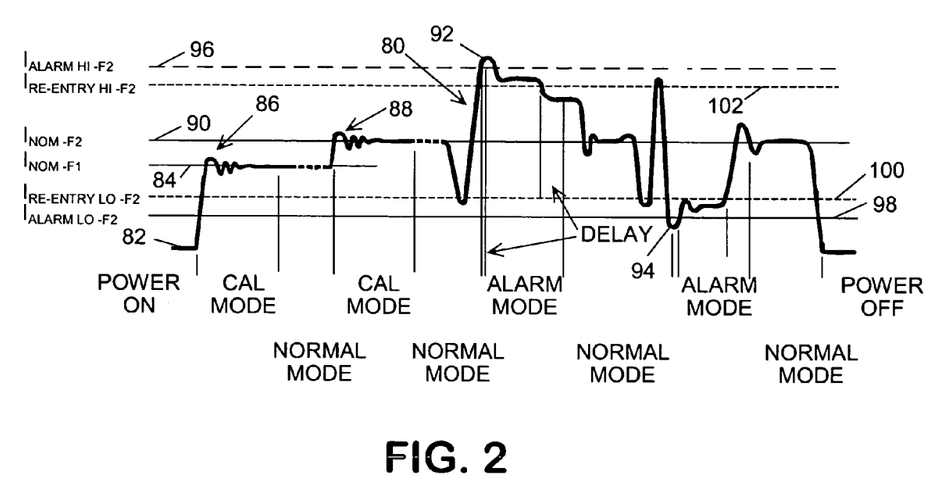
FIG. 2 is an exemplary plot of power cable current.

Referring to FIG. 2, when an electric motor, drivingly connected to a mechanical load, such as a fan or a pump, is started 82, the current draw in the power cable increases towards a nominal operating current 84 that is determined by characteristics of the motor, the mechanical load on the motor, and the voltage and the frequency of the variable frequency drive's output. Initially, the current in the power cable may fluctuate due to in-rush effects and acceleration of the mechanical load 86. However, the transient current excursions occurring at start up and changes in speed typically dissipate and the current draw of the motor normally settles at a relatively constant nominal current draw if the mechanical load on the motor remains constant. If the motor's control system directs a change in the speed of the motor, the frequency and voltage of the output of the variable frequency drive and the current draw of the motor will change 88 and, following dissipation of transient currents, the current draw typically settles at a new nominal current ($I_{nom}$) 90 which corresponds to the new drive frequency. A malfunction in the system is typically indicated by a significant increase or decrease in the current draw of the motor. For example, an electrical short or the seizure of the bearings of the motor or the mechanical load will cause a significant increase in the current draw 92 which, if not due to a failure, is an indication of pending failure. Likewise, a failure of the belt or the coupling to the mechanical load will produce a substantial decrease 94 in current flowing to the motor through the power cable. The current switch detects changes in current flowing in a power cable and provides an alarm signal enabling a system controller to take appropriate action to protect the system, such as opening the contactor 50 to shut down the motor and/or start or stop other portions of the system to avoid potential problems that might be precipitated by the failure of the monitored portion of the system.

When a new current switch is installed, for example as a replacement or as one of a plurality of current switches for a new electrical distribution and control system, the current switch typically must be calibrated for the operating current range of the specific portion of the system that is to be monitored by the switch. The process of determining the expected range of the operating currents in a particular portion of the circuit to be monitored by the current switch and manually calibrating one or more current switches can be lengthy and tedious because the system's power supply, motors or other loads to be monitored and, as a consequence, the current switches, may be remote from the controller and may be dispersed throughout a large area. The present inventors concluded that a current switch that automatically calibrates itself when installed in an electrical circuit could substantially reduce the time and cost of installing and maintaining an electrical distribution and control system.

Figure 3:
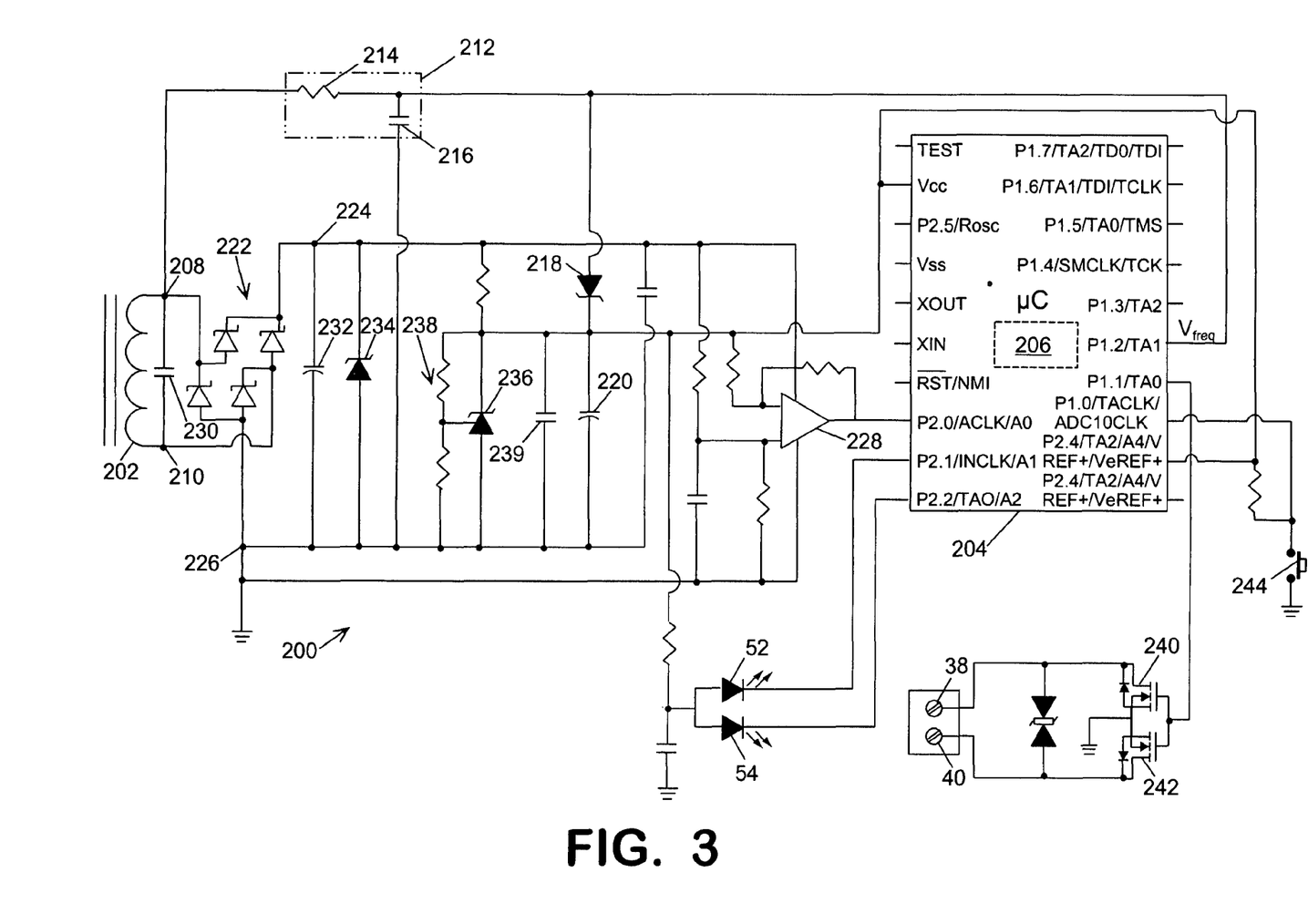
FIG. 3 is an electrical schematic of a first embodiment of a current switch with automatic calibration.

Referring to FIG. 3, the automatically calibrating current switch 200 comprises a sensor 202 to detect the magnitude and frequency of current flowing in a power cable and a data processing unit, typically a microcontroller 204 that includes a memory 206, and program instructions enabling the microcontroller to determine whether the measured magnitude and frequency of the current are indicative of a malfunction in the monitored circuit.

Figure 4:
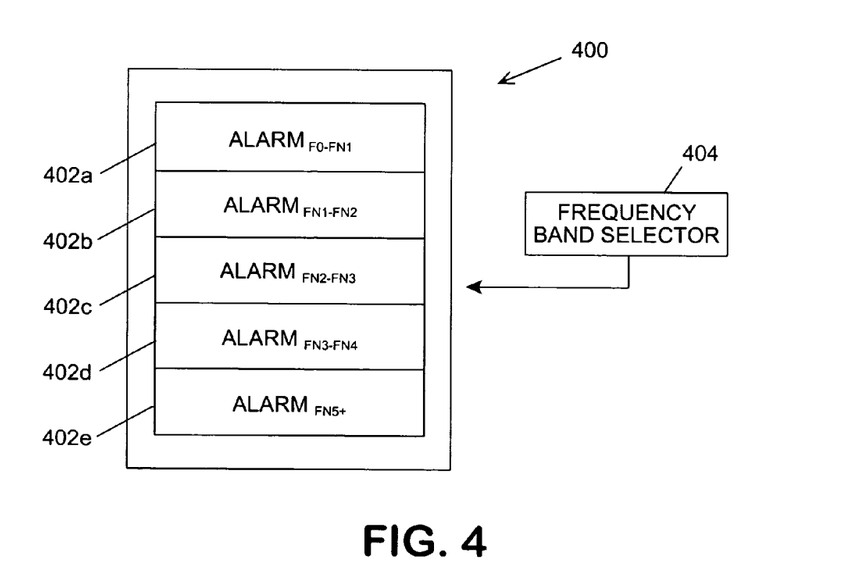
FIG. 4 is a block diagram of an exemplary operating frequency range of a variable frequency drive.

Referring to FIG. 4, the operating frequency range 400 of the monitored current is typically divided into a plurality of frequency bands, for example five frequency bands 402a-402e, and one or more alarm activation current(s) is determined and stored in the memory of the microcontroller for each frequency band. The frequency bands are selected to concentrate the bands where the motor usually operates. For example, a preferred embodiment includes five frequency ranges; 0-30 Hz, 31-38 Hz, 39-47 Hz, 48-56 Hz, and 57 Hz and up although the number and range of the frequency bands may be changed, as desired. To determine if the circuit is operating correctly, the frequency and magnitude of the alternating current in the power cable is detected. The microcontroller processes instructions comprising a frequency band selector 404 that determines which of the frequency bands includes the detected frequency of the power cable current. The detected amplitude of the power cable current is compared to at least one stored activation current correlated to the selected frequency band. If the current in the power cable is within predetermined upper and lower current limits for the frequency band, the system is operating normally and a green light emitting diode (LED) 52 is displayed on the current switch. If the detected current exceeds a predetermined upper alarm current ($I_{ALARM-HI}$) 96 or if the detected current is less than a predetermined lower alarm current ($I_{ALARM-LO}$) 98, the current switch will signal an alarm condition by changing the conductive status of the switch contacts and energizing a red (LED) 54. If the current draw returns to an acceptable or re-entry level ($I_{RE-ENTRY-HI}$) 102, ($I_{RE-ENTRY-LO}$) 100, the current switch will return to the normal operating mode by returning switch contacts to the original conductive state, disabling the red LED and illuminating the green LED. In a preferred embodiment, the activation current for each frequency band comprises a nominal power cable current draw ($I_{nom}$) and the current levels at which an alarm state is initiated or disabled are a function of the nominal power cable current. In a preferred embodiment, the upper alarm current is 20% greater than the nominal power current for a respective frequency band and the lower alarm current is 20% less than the nominal power cable current. The upper and lower re-entry currents are respectively 15% greater and 15% less than the nominal power cable current. A current switch for monitoring a circuit operated at a single frequency does not require sensing of the power cable current frequency or correlation of an activation current to a frequency or frequency band.

The current sensor typically comprises a current transformer 202 which is, preferably, a wire wrapped toroidal core surrounding a power cable that connects the power source to the load. The power cable serves as the primary winding of the transformer and the wire winding of the core as the secondary winding of the transformer. The toroidal core may be an iron core or an air core (a non-magnetically permeable material). A suitable core is disclosed in U.S. Pat. No. 5,502,374, assigned to the same assignee and incorporated herein by reference. The alternating current in the power cable produces an output voltage signal at the terminals 208 and 210 of the current transformer having a frequency corresponding to the frequency of the alternating current in the power cable and a magnitude that is related to the magnitude of the current flowing in the cable.

To determine the frequency of the alternating current in the power cable, the number of repetitions of a cyclically repeating feature of the AC signal, such as a rising edge, are counted over a specific time interval. Variable frequency drives modulate a carrier signal, generally around 2000 Hz, to produce relatively low frequency output signals, typically 0 to 100 Hz, to operate the motor. Modulation of the carrier signal generates significant noise and other stray signals that could interfere with accurate sensing of the primary drive signal to the motor. In addition, the current transformer generates harmonics of the drive signal; for example, a 60 Hz drive signal would generate harmonics at 120 Hz, 180 Hz, 240 Hz, etc. To remove the stray signals, noise, and harmonics and to obtain a signal representative of only the primary drive signal, the AC signal at the terminals of the current transformer is filtered by a low pass filter 212, comprising a resistor 214 and a capacitor 216. A diode 218 clamps the amplitude of the AC voltage signal to an amplitude suitable for input to the microcontroller and a capacitor 220 reduces ripples in the AC input to the microcontroller.

The filtered AC signal ($V_{freq}$) from the current transformer is conducted to the microcontroller 204 which includes a counter that can be triggered by a clock signal. The counter counts cycle distinguishing features, for example a rising edge, of the AC signal until the counter receives the next clock signal. The counter is reset to zero upon receiving each clock signal and the number of rising edges detected between successive clock signals is stored. The total number of rising edges counted during a one second interval is the frequency of the alternating current in the power cable. Alternatively, both the rising and falling edges may be counted to determine the frequency or other cycle distinguishing features such as zero crossings, peak amplitudes, etc. might be used to determine the frequency.

A rectifier 222, also connected to the terminals of the current transformer, rectifies the output voltage signal from the terminals to produce a DC output signal at the rectifier's output terminals 224, 226. The DC signal is substantially proportional to the magnitude of the current flowing in the power cable and, following differential amplification by an operational amplifier (op amp) 228, is the signal sampled by the microcontroller to determine the magnitude of the current flowing in the power cable.

A resonating capacitor 230, also connected to the output terminals of the current transformer, is selected so that it resonates at an operating frequency of the alternating current in the power cable. The resonating capacitor increases the amplitude of the voltage of the output signal of the current transformer at frequencies near the resonate frequency of the circuit comprising the resonate capacitor and the coil of the current transformer. The resonance produces little effect at higher power levels but at low current levels distorts the waveform sufficiently to increase the root mean square (RMS) value of the voltage signal and provide sufficient supply voltage ($V_{cc}$) for the operation of the microcontroller when the current level in the power cable is low.

Figure 5:
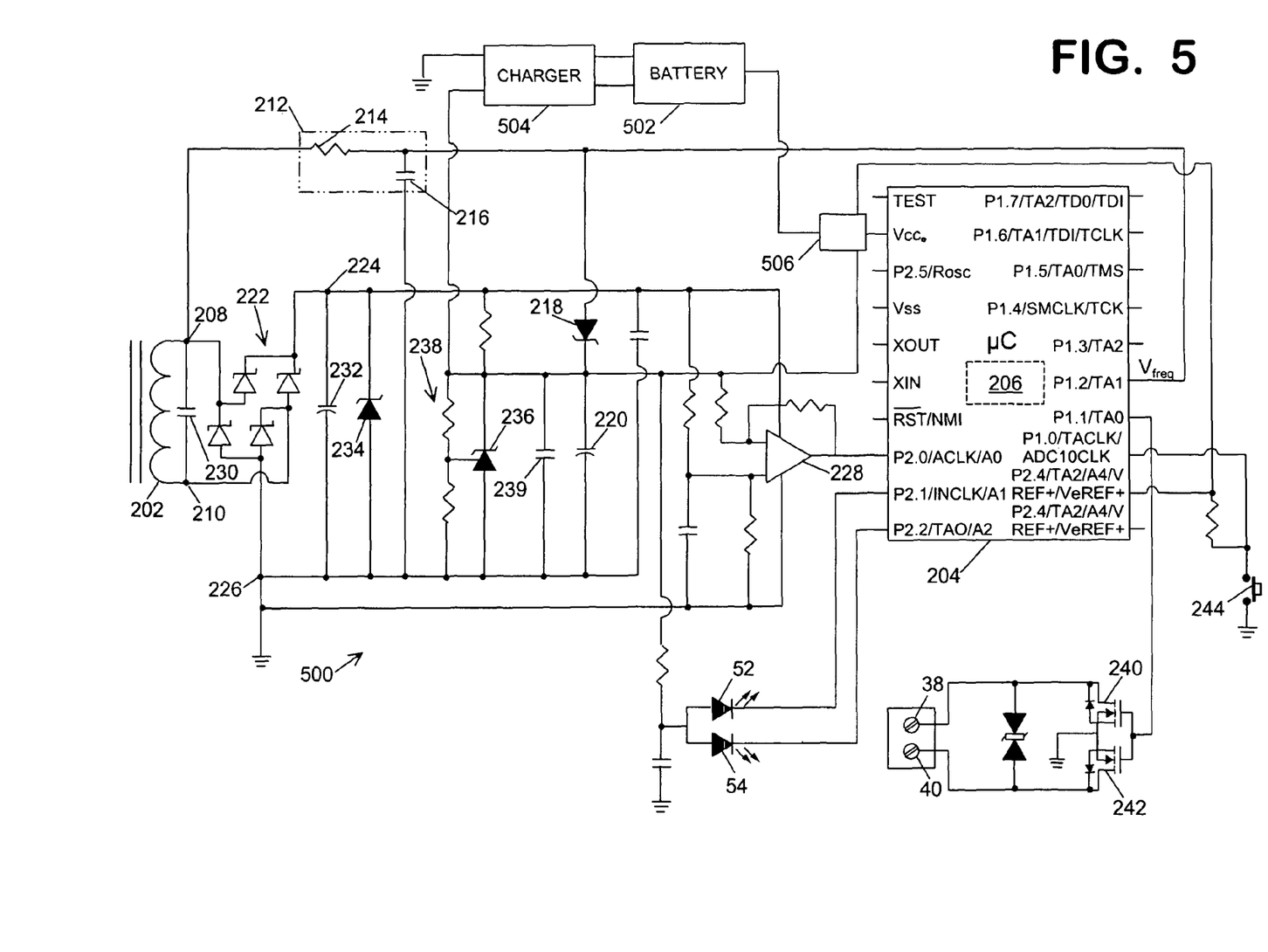
FIG. 5 is an electrical schematic of a second embodiment of a current switch with automatic calibration.

Alternatively, referring to FIG. 5, a battery 502 could be provided to power the operation of the current switch 500 when the current flow in the power cable is insufficient to ensure proper operation of the microcontroller. A switch 506 controlled by the microcontroller could be provided to switch between the battery and the power cable signal as power sources from the microcontroller. A battery charger 504 could be provided to refresh the battery during periods of higher power cable current. However the additional complexity may be source of additional maintenance requirements.

A filter capacitor 232, connected between the output terminals of the rectifier, filters ripples in the rectifier's output signal induced by fluctuations of the current in the power cable. A diode clamp 234, in parallel with the filter capacitor, limits the magnitude of the output voltage signal from the rectifier to protect the op amp from over voltage. Another diode 236, biased by a voltage divider 238 shunts excess current to ground to prevent excessive voltage at the voltage terminals of the op-amp. A capacitor 239 reduces noise in the supply voltage ($V_{cc}$) for the microcontroller.

The output of the op amp 228 is an analog signal having amplitude, varying between 0 volts and 3 volts, which is substantially proportional to the magnitude of the current in the power cable. The output of the op amp is connected to a general purpose input-output pin of the microcontroller which provides sampling of the analog signal and analog-to-digital (A/D) conversion. The microcontroller determines the operating current ($I_o$) in the power cable from the magnitudes of the voltage samples and compares the operating current to the upper and lower alarm and re-entry current values for the frequency band that includes the detected frequency of the current in the power cable to determine whether the operation of the monitored circuit is within normal current limits.

Outputs of the microcontroller control the operation of a pair of light emitting diodes (LED). When the power cable current is within normal limits, a signal from the microcontroller illuminates a green LED 52 and when an alarm condition is indicated, another signal from the microcontroller causes a red LED 54 to illuminate. During the interval of automatic calibration of the current switch, the microcontroller's signals periodically alternate illumination of the red and green LEDs.

The current switch also includes terminals 38 and 40 which may be connected to a remote device, such as a system controller, to signal normal or abnormal operation of the monitored circuit. The terminals are communicatively connected by transistors 240 and 242. When a signal from the microcontroller is applied to the gates of the transistors, the terminals are conductively connected and when the gate signal is removed the connection between the terminals is opened. A conductively open or a conductively closed condition of the terminals can be selected to signal normal operation by selecting one of the output signal states of the microcontroller. When an alarm condition is initiated, the conductive state of the terminals can be toggled by outputting the second state of the microcontroller signal.

Activation of a reset control 244, typically a push button switch, enables the values of the activation currents stored in the microcontroller to be reset to a default value.

Figure 6:
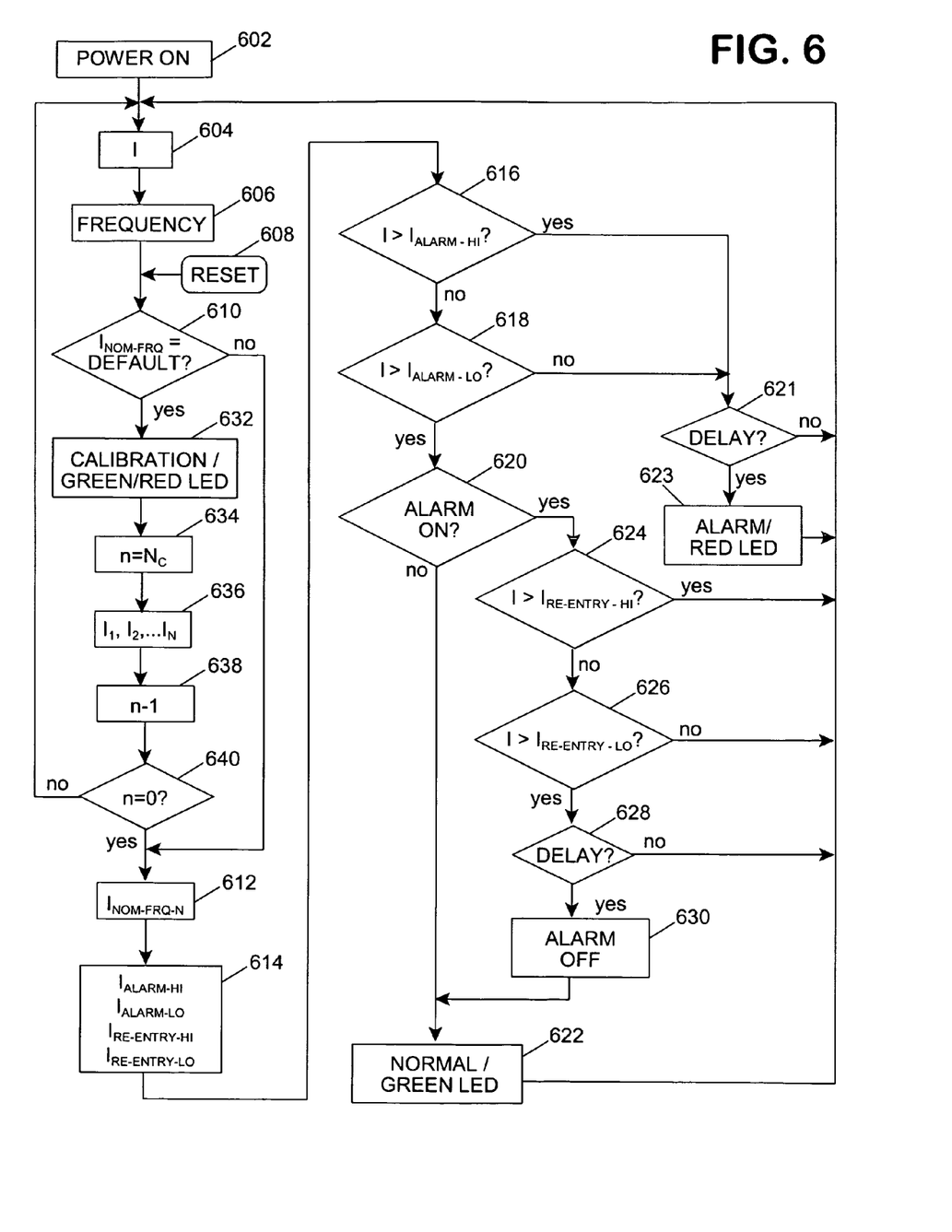
FIG. 6 is a flow diagram of a method of operation of a current switch with automatic calibration.

Referring to FIG. 6, when power is applied to the cable passing through the current transformer 602, the op-amp outputs a signal and the microcontroller initiates sampling of the output to determine the magnitude (I) 604 of the alternating current flowing in the cable and starts counting cycles of the AC signal to determine the frequency 606 of the power cable current. The microcontroller processes frequency selection instructions enabling selection of the predetermined frequency band that includes the frequency of the current flowing in the power cable.

When the current switch is manufactured, a default value, preferably a value outside of the operating range for the activation current(s) of the current switch, is stored in the memory of the microcontroller for the value(s) of the activation current that is stored for each of the frequency bands. Similarly, when the reset button is actuated 608, the value(s) stored as the activation current for each frequency band will be replaced by the default value. The microcontroller determines if the activation current value(s) stored in the memory for the appropriate frequency band is the default value 610. If the stored value of the current is not the default value, the upper ($I_{ALARM-HI}$) and the lower ($I_{ALARM-LO}$) alarm currents and the upper ($I_{RE-ENTRY-HI}$) and the lower ($I_{RE-ENTRY-LO}$) re-entry currents are determined for the appropriate frequency band 614. In a preferred embodiment, the alarm and re-entry currents are functions of the nominal current for the circuit at the detected frequency and can be calculated from the nominal current which is the stored value of the activation current 612. However, other values could be selected for the alarm and re-entry currents.

The microcontroller determines if the operating current is greater than the upper alarm current 616 indicating a possible electrical short or high friction. If not, the microcontroller determines if the operating current is less than the lower alarm current 618, indicating a possible drive belt or coupling failure. If the operating current is within the upper and lower alarm current limits, the microcontroller determines if the alarm has been activated 620. If not, the current switch indicates normal operation by illuminating the green LED and setting the switch contacts to the normal conductive state 622 and the process is repeated.

If, however, the operating current is greater than the appropriate upper alarm current 616 or less than the lower alarm current 618, the microcontroller initiates an internal delay timer 621 and continues to monitor the power cable current. In a preferred embodiment, a one second delay between the detection of a current level warranting an alarm and the initiation of the alarm avoids false alarms caused by momentary current excursions. If the over or under current condition continues for a period longer than the preset delay, the microcontroller changes the conductive state of the current switch contacts and illuminates a red LED to indicate an alarm state 622.

Once an alarm condition has been initiated, it will continue unless the current returns to a level less than the upper re-entry current and greater than the lower re-entry current. If the power cable current is less than the upper alarm current 616 and greater than the lower alarm current 618, the microcontroller determines if the alarm has been activated 620. If so, the magnitude of the power cable current is compared to the upper re-entry current 624 and the lower re-entry current 626. If the power cable current is still greater than the upper re-entry current or less than the lower re-entry current, the alarm is maintained. If, however, the power cable current is less than the upper re-entry current and greater than the lower re-entry current, the microcontroller determines if the power cable current has been at this level for a period of delay 628 before disabling the alarm 630, restoring the current switch terminals to the normal conductive state and illuminating the green LED 622. In a preferred embodiment, a return to the NORMAL state is delayed for 30 seconds to increase confidence that the current draw has returned to normal levels and avoid repeated alarms due to momentary or short lived current fluctuations.

If the current switch is new or if the reset button has been activated, the value(s) of the activation current stored in the memory of the microcontroller will be set to the default value. When the microcontroller determines that the stored value of the activation current corresponding to the frequency band that includes the frequency of the power cable current is the default value 610, the current switch initiates a calibration mode and alternately illuminates the green LED and the red LED to provide a visual indication to a human attendant that the current switch is operating in the calibration mode 632.

A counter is initialized to count the samples taken of the output of the op amp during the calibration mode interval 634. In a preferred embodiment, the calibration mode extends for an interval of 30 seconds from initiation to allow the current to stabilize around a nominal current and avoid transient and in-rush current effects that accompany start up and speed change under load. However, the calibration mode interval can be extended or reduced as desired. As succeeding samples are periodically taken, the magnitudes of the samples are accumulated by the microcontroller 636 and the sample counter is decremented 638. When the number samples of equals the number of sample periods in the calibration interval ($n=N_c$) 640, the microcontroller determines the appropriate upper ($I_{ALARM-HI}$) and lower ($I_{ALARM-LO}$) alarm currents and the upper ($I_{RE-ENTRY-HI}$) and the lower ($I_{ALARM-LO}$) currents 614. In the preferred embodiment, the upper and lower alarm currents and the upper and lower re-entry currents are a function of the nominal current draw for the respective frequency band. For example, the alarm currents are respectively 20% greater and 20% less than the nominal operating current for the frequency band and the re-entry currents are 15% greater and 15% less, respectively, than the nominal operating current. In the preferred embodiment, the nominal operating current 612 is determined for the frequency band by averaging the magnitudes of the current samples obtained during the calibration interval and is stored as the activation current for the frequency band that includes the frequency of the power cable current. However, the nominal operating current could be determined by other methods such as the average or mean sample value for a portion of the calibration interval or after a time delay to reduce the effects of transient currents resulting from changes in the power cable current. In the preferred embodiment, the nominal operating current is stored as the activation current for the correlated frequency band and the respective upper and lower alarm and upper and lower re-entry currents are calculated from the nominal operating current. However, to reduce calculation requirements, the upper and lower alarm currents and the upper and lower re-entry currents can be stored as activation currents for a frequency band.

Installation cost is reduced by automatic calibration of the current switch to the current levels of experienced during a period of operation of the monitored circuit.

The detailed description, above, sets forth numerous specific details to provide a thorough understanding of the present invention. However, those skilled in the art will appreciate that the present invention may be practiced without these specific details. In other instances, well known methods, procedures, components, and circuitry have not been described in detail to avoid obscuring the present invention.

All the references cited herein are incorporated by reference.

The terms and expressions that have been employed in the foregoing specification are used as terms of description and not of limitation, and there is no intention, in the use of such terms and expressions, of excluding equivalents of the features shown and described or portions thereof, it being recognized that the scope of the invention is defined and limited only by the claims that follow.

We claim:

1. A method of monitoring a current in a power cable, said method comprising the steps of:
   (a) storing a default activation current in a memory before measuring a current in said power cable;
   (b) measuring a current in said power cable;
   (c) if an activation current stored in said memory is said default activation current, replacing said default activation current with a stored activation current determined from a measured current in said power cable; and
   (d) initiating and, alternatively, disabling an alarm if a magnitude of said power cable current varies in a predetermined manner from said stored activation current.

2. The method of monitoring a current of claim 1 further comprising the step of replacing said stored activation current with said default activation current when a reset control is activated.

3. The method of monitoring a current of claim 1 wherein said activation current is a function of a nominal power cable current.

4. The method of monitoring a current of claim 1 wherein said activation current is a function of an average of a plurality of power cable current measurements.

5. The method of monitoring a current of claim 1 wherein said activation current comprises at least one of:
   (a), an upper alarm current which, if exceeded by said power cable current, causes an alarm to initiate;
   (b) a lower alarm current which, if not exceeded by said power cable current, causes an alarm to initiate;
   (c) an upper re-entry current causing an alarm to be disabled if said alarm was initiated in response to a first power cable current greater than said upper alarm current and if a subsequent power cable current is less than said upper re-entry current; and
   (d) a lower re-entry current causing an alarm to be disabled if said alarm was initiated in response to a first power cable current not exceeding said lower alarm current and if a subsequent power cable current is greater than said upper re-entry current.

6. The method of monitoring an electric current of claim 1 comprising the steps of:
   (a) determining a frequency of said power cable current; and
   (b) using said frequency of said power cable current to select one of a plurality of stored activation current values, each said activation current value correlated to a range of frequencies.

7. A method of monitoring a current in a power cable, said method comprising the steps of:
   (a) before measuring a current in said power cable, storing in a memory a default value for a plurality of activation currents, each of said activation currents correlated to a range of frequencies;
   (b) detecting a frequency of said current in said power cable;
   (c) measuring a magnitude of said power cable current;
   (d) selecting one of said stored activation currents, said selected activation current correlated to a range of frequencies inclusive of said frequency of said power cable current;
   (e) if said selected activation current has a default value, determining a new activation current from said measured magnitude of said power cable current;
   (f) storing said new activation current as replacement for said selected activation current; and
   (g) initiating and, alternatively, disabling an alarm if said power cable current varies in a predetermined manner from a stored activation current correlated to a measured frequency of said power cable current.

8. The method of monitoring a current of claim 7 further comprising the step of storing said default value for each of said plurality of activation currents when a reset control is activated.

9. The method of monitoring a current of claim 7 wherein said new activation current is a function of a nominal power cable current.

10. The method of monitoring an electric current of claim 9 wherein said activation current comprises one of:
    (a) an upper alarm current which, if exceeded by said power cable current, causes an alarm to initiate;
    (b) a lower alarm current which, if not exceeded by said power cable current, causes an alarm to initiate;
    (c) an upper re-entry current causing an alarm to be disabled if said alarm was initiated in response to a first power cable current greater than said upper alarm current and if a subsequent power cable current is less than said upper re-entry current; and
    (d) a lower re-entry current causing an alarm to be disabled if said alarm was initiated in response to a first power cable current not exceeding said lower alarm current and if a subsequent power cable current is greater than said upper re-entry current, at least one of said upper alarm current, said lower alarm current, said upper re-entry current and said lower re-entry current being a function of said nominal power cable current.

11. The method of monitoring a current of claim 7 wherein said new activation current is a function of an average of a plurality of power cable current measurements.

12. The method of monitoring a current of claim 10 further comprising the steps of:
    (a) measuring said power cable current;
    (b) repeating step (a) for an interval enabling a substantial dissipation of transient current effects; and
    (c) averaging said plurality of current measurements.

13. The method of monitoring an electric current of claim 7 wherein said activation current comprises one of:
    (a) an upper alarm current which, if exceeded by said power cable current, causes an alarm to initiate;
    (b) a lower alarm current which, if not exceeded by said power cable current, causes an alarm to initiate;
    (c) an upper re-entry current causing an alarm to be disabled if said alarm was initiated in response to a first power cable current greater than said upper alarm current and if a subsequent power cable current is less than said upper re-entry current; and
    (d) a lower re-entry current causing an alarm to be disabled if said alarm was initiated in response to a first power cable current not exceeding said lower alarm current and if a subsequent power cable current is greater than said upper re-entry current.

14. A current switch for monitoring an electric current in a power cable, said current switch comprising:
    (a) a current sensor producing an output signal in response to a current in a power cable, said output signal having a magnitude related to a magnitude of said power cable current and a frequency related to a frequency of said power cable current;

(b) a memory communicatively connected to enable a data processing device to store a value for an activation current in said memory and read said stored value of said activation current, a default value for said activation current being stored in said memory before said power cable current is sensed; and (c) a data processing device communicatively connected to said memory and said current sensor, said data processing device including a program instruction to cause said data processing device to:
  (i) measure of a magnitude of said power cable current;
  (ii) read said stored value of said activation current; and
  (ii) if said stored value of said activation current is said default value, replace said stored value of said activation current with a new activation current determined from said measured magnitude of said power cable current.

15. The current switch of claim 14 wherein said program instruction to cause said data processing system to replace said stored value of said activation current with a new activation current determined from said measured magnitude of said current in said power cable if said stored value of said activation current is said default value comprises a program instruction to:
  (a) average a plurality of magnitudes of said power cable current measured during a calibration interval; and
  (b) store said average of said measured power cable current magnitudes in a memory portion occupied by said default value for said activation current.

16. A current switch for monitoring an electric current in a power cable, said current switch comprising:
  (a) a current sensor producing an output signal in response to a current in a power cable, said output signal having a magnitude related to a magnitude of said power cable current and a frequency related to a frequency of said power cable current;

(b) a memory communicatively connected to enable a data processing device to store a value for each of a plurality of activation currents, each said activation current correlated to a frequency, and read said stored values of said activation currents, a default value being stored in said memory for each said activation current before said power cable current is sensed; and (c) a data processing device communicatively connected to said memory and said current sensor, said data processing device including a program instruction to cause said data processing device to:
  (i) measure a frequency of said power cable current,
  (ii) measure of a magnitude of said power cable current;
  (iii) read said stored value of said activation current correlated to said frequency of said power cable current; and
  (iv) if said stored value of said activation current is said default value, replace said stored value of said activation current correlated to said frequency of said power cable current with a new activation current determined from said measured magnitude of said current in said power cable.

17. The current switch of claim 16 wherein said program instruction to cause said data processing system to replace said stored value of said activation current with a new activation current determined from said measured magnitude of said current in said power cable if said stored value of said activation current is said default value comprises a program instruction to:
  (a) average a plurality of magnitudes of said power cable current measured during a calibration interval; and
  (b) store said average of said measured power cable current magnitudes in a memory portion occupied by said default value for said activation current correlated to said frequency of said power cable current.

* * * * *

UNITED STATES PATENT AND TRADEMARK OFFICE
CERTIFICATE OF CORRECTION

| | |
|---|---|
| PATENT NO. | : 7,855,655 B2 |
| APPLICATION NO. | : 12/228484 |
| DATED | : December 21, 2010 |
| INVENTOR(S) | : Phillip Hunter et al. |

It is certified that error appears in the above-identified patent and that said Letters Patent is hereby corrected as shown below:

Col. 8, Line 24

Change: "When the number samples of" to read: --When the number of samples--.

Col. 9, Line 32

Change: "(a)," to read: --(a)--

Signed and Sealed this
Twenty-first Day of February, 2012

David J. Kappos
*Director of the United States Patent and Trademark Office*